Dec. 11, 1928.
D. F. GOOD
1,695,146
CASING FOR ANTIFRICTION BEARING
Filed Aug. 10, 1927
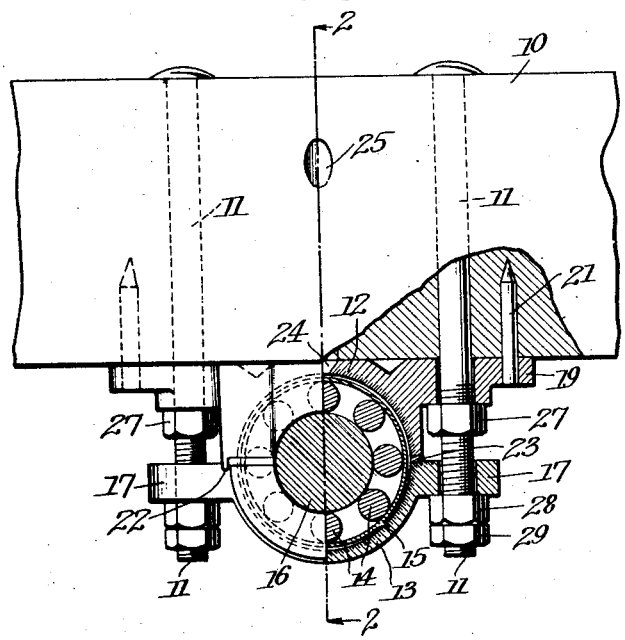
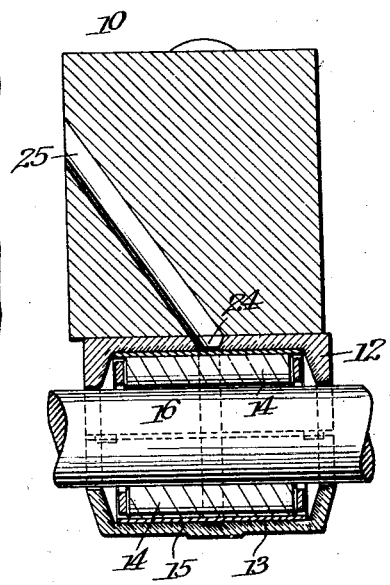
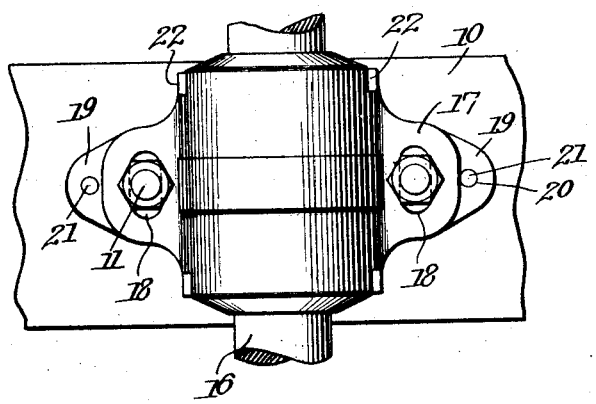
Inventor
Daniel F. Good
By
Attorney Patented Dec. 11, 1928.

1,695,146

UNITED STATES PATENT OFFICE.

DANIEL F. GOOD, OF WAYNESBORO, PENNSYLVANIA, ASSIGNOR TO FRICK COMPANY, OF WAYNESBORO, PENNSYLVANIA, A CORPORATION.

CASING FOR ANTIFRICTION BEARING.

Application filed August 10, 1927. Serial No. 212,087.

My invention relates to a casing for an antifriction bearing and the manner of attaching said bearing to a device supported and it is an object of the invention to provide a casing having an accurate surface formed in the process of casting the same of a size to snugly house a roller bearing without requiring the performance of machining operations, all as will be hereinafter more particularly described and claimed.

I employ a well-known type of roller bearing having an outer sleeve or race which, therefore, does not require the interior of the receiving and retaining casing to have a hard bearing surface but, on the other hand, it is only necessary that such casing have an accurate surface which I obtain by a casing made by the chilling process or otherwise.

In the process of manufacture of devices of this character considerable time and money is unnecessarily expended in machining the castings, which renders the process of assembling the various units very slow and complicates the process of manufacture, all of which in accordance with the object of my invention will be eliminated by my process.

Referring to the drawings which are made a part hereof and in which similar reference characters indicate similar parts:

Figure 1 is a part end elevation, part sectional view of the casing constructed in accordance with my invention enclosing a roller bearing.

Figure 2, a longitudinal section on line 2—2 of Fig. 1, and

Figure 3, a bottom plan view.

Referring to the drawings, reference character 10 indicates the sill or side rail of a saw mill carriage which reciprocates past the saw for moving a log or the like to be cut into the saw. On the under side of the sill or side rail is secured, by means of bolts 11, an upper bearing member 12 which cooperates with a lower bearing member or binding cap 13 for retaining a conventional roller bearing 14 provided with an enclosing sleeve or race 15 therein. The upper and lower bearing members are cast by the chilling process in order to provide an accurate bearing surface, such accuracy being attainable by such process. It is not necessary to provide a hard inner surface on the sections of the casing since the rollers do not bear directly against such surface but roll within the sleeve or race 15 which houses the rollers and is itself housed by the casing. An axle 16 extends through the roller bearing 14 and is provided with supporting wheels (not shown).

As shown in Fig. 3, the upper bearing member which forms substantially one-half of the casing is provided with a pair of ears 17 having longitudinally arranged slots 18 through which the bolts 11 extend. Likewise the ears 17 are provided with extensions 19 of slightly less thickness than the ears 17 and such extensions are provided with apertures 20 through which pins 21 are driven into the sill or side rail 10 for holding the bearing in proper adjusted position. The upper bearing member is provided with a pair of lugs 22, one at each side of the same, which maintain the gaskets 23 in position and prevent the leakage of lubricant between the upper and lower bearing members. The upper bearing member is provided with an oil hole 24 through which oil or other lubricant may be supplied from a passage 25 in the sill or side rail 10 to the roller bearing from a lubricant channel 26 formed in the upper and lower bearing members.

The bolts 11 are threaded for a considerable distance along their lower ends and nuts 27 serve to retain the upper bearing member in position during assembling before the bearing is properly centered and prior to the application of the lower bearing member or cap. After initially bolting the upper bearing member 12 on the under side of the sill or side rail 10 by the nuts 27, a line is stretched from one side rail to the other longitudinally of the bearings at each side of the carriage and the carriage wheels (not shown) are brought into proper alignment, each with the other. The nuts 27 are then tightened and the pins 21 are driven to securely fasten the upper bearing member in position. The lower bearing member or binder cap is then applied, nuts 28 are tightened for retaining the cap in place and lock nuts or jam nuts 29 are applied for preventing the nuts 28 from becoming loose.

From the foregoing it will be apparent that I have provided an anti-friction bearing casing which is of simple and inexpensive construction and which requires no machine work.

It will be obvious to those skilled in the art that various changes may be made in my device, without departing from the spirit of my invention, and I, therefore, do not limit myself to what is shown in the drawings and described in the specification, but only as set forth in the appended claim.

Having thus fully described my invention, what I claim as new and desire to secure by Letters Patent, is:

The combination of a side rail, an upper bearing member beneath said side rail, a lower bearing member beneath said upper bearing member, said bearing members being formed with substantially semi-cylindrical recesses for enclosing a substantially cylindrical bearing, said recesses having a central lubricant channel, a passage for lubricant formed in said side rail communicating with said lubricant channel, said bearing members being provided with ears at each side, the upper bearing member having perforated extensions at the outer edges of said ears, pins extending through said perforations into said side rail for holding the upper bearing member in proper position, the ears at the sides of said bearing members being provided with openings, bolts extending through said side rail and through said openings fastening the bearing members to the side rail, said bearing members comprising castings molded to exact size, substantially as set forth.

In witness whereof, I have hereunto set my hand at Waynesboro, Pennsylvania, this second day of August, A. D. nineteen hundred and twenty-seven.

DANIEL F. GOOD.